(12) United States Patent
Ng et al.

(10) Patent No.: US 8,535,486 B2
(45) Date of Patent: Sep. 17, 2013

(54) APPARATUS AND METHOD FOR DESALINATION

(75) Inventors: Kim Choon Ng, Singapore (SG);
Xiao-Lin Wang, Singapore (SG);
Lizhen Gao, Singapore (SG); Anutosh Chakraborty, Kasuga (JP); Bidyut Baran Saha, Kasuga (JP); Shigeru Koyama, Kasuga (JP); Atsushi Akisawa, Koganei (JP); Takao Kashiwagi, Koganei (JP)

(73) Assignees: National University of Singapore, Singapore (SG); Kyushu University, Higashi-Ku, Fukuoka (JP)

( * ) Notice: Subject to any disclaimer, the term of this patent is extended or adjusted under 35 U.S.C. 154(b) by 881 days.

(21) Appl. No.: 11/914,320

(22) PCT Filed: May 11, 2006

(86) PCT No.: PCT/SG2006/000157
§ 371 (c)(1),
(2), (4) Date: Apr. 29, 2008

(87) PCT Pub. No.: WO2006/121414
PCT Pub. Date: Nov. 16, 2006

(65) Prior Publication Data
US 2010/0258426 A1    Oct. 14, 2010

(51) Int. Cl.
*C02F 1/04* (2006.01)
*C02F 1/28* (2006.01)
*B01D 3/00* (2006.01)
*B01D 53/02* (2006.01)
*B01D 53/14* (2006.01)

(52) U.S. Cl.
USPC ........ 203/10; 62/94; 62/480; 95/115; 95/117;
96/122; 96/126; 202/183; 202/185.4; 202/258;
203/12; 203/41; 203/100; 261/128; 261/148

(58) Field of Classification Search
USPC ................ 62/94, 480; 95/115, 117; 96/122,
96/126; 202/182, 183, 185.4, 258; 203/10,
203/12, 41, 100; 261/128, 148; 422/177;
165/113
See application file for complete search history.

(56) References Cited

U.S. PATENT DOCUMENTS 3,625,886 A * 12/1971 Mattia ........................... 210/673
4,071,398 A * 1/1978 Baierl ............................. 162/15

(Continued)

FOREIGN PATENT DOCUMENTS

GB    2 342 193 A    4/2000
JP    2004-080935    3/2004

OTHER PUBLICATIONS

International Search Report for corresponding International Application No. PCT/SG2006/000157, dated Aug. 2, 2006.

(Continued)

*Primary Examiner* — Virginia Manoharan
(74) *Attorney, Agent, or Firm* — Heslin Rothenberg Farley & Mesiti P.C.; Victor A. Cardona, Esq.

(57) ABSTRACT

A water desalination system includes an evaporator for evaporating saline water to produce water vapor and an adsorption means in selective vapor communication with the evaporator for reversibly adsorbing the water vapor from the evaporator. The adsorption means is in selective vapor communication with a condenser, and desorbing means for desorbing the adsorbed water vapor from the adsorption means for collection by the condenser. The condenser is adapted to condense the water vapor to desalinated water.

35 Claims, 5 Drawing Sheets

(56) References Cited

U.S. PATENT DOCUMENTS

| | | | |
|---|---|---|---|
| 4,219,341 A | | 8/1980 | Hussmann |
| 4,285,702 A | | 8/1981 | Michel et al. |
| 4,365,979 A | | 12/1982 | Takeyama et al. |
| 4,479,814 A | * | 10/1984 | Oliker .............................. 96/115 |
| 4,664,752 A | * | 5/1987 | Zievers et al. ................... 203/10 |
| 4,874,524 A | * | 10/1989 | Liapis et al. ................... 210/672 |
| 5,154,735 A | * | 10/1992 | Dinsmore et al. ................ 95/92 |
| 5,768,904 A | * | 6/1998 | Tagamolila et al. ......... 62/238.3 |
| 5,802,870 A | * | 9/1998 | Arnold et al. ................... 62/480 |
| 5,846,296 A | | 12/1998 | Krumsvik |
| 6,638,429 B1 | | 10/2003 | Bussmann et al. |
| 7,241,313 B2 | | 7/2007 | Unwin et al. |
| 2002/0053217 A1 | * | 5/2002 | Chua et al. ...................... 62/480 |
| 2004/0243237 A1 | | 12/2004 | Unwin et al. |
| 2005/0044862 A1 | * | 3/2005 | Vetrovec et al. ................... 62/93 |
| 2012/0119396 A1 | * | 5/2012 | Saha et al. ..................... 261/128 |

OTHER PUBLICATIONS

Written Opinion of the International Preliminary Examining Authority for corresponding International Application No. PCT/SG2006/000157, dated Mar. 30, 2007.

Written Opinion of the International Searching Authority for corresponding International Application No. PCT/SG2006/000157, dated Jul. 27, 2006.

* cited by examiner

APPARATUS AND METHOD FOR DESALINATION

CROSS REFERENCE TO RELATED APPLICATIONS

This application is a national stage of PCT International Application No. PCT/SG2006/000157, filed on May 11, 2006, and published in English on Nov. 16, 2006 as WO 2006/12141 A1, which claims priority to Singaporean Application No. 200503029-1, filed May 12, 2005, the entire disclosures of which are incorporated herein by reference.

FIELD OF THE INVENTION

The invention relates to the desalination of saline or brackish water including a method for in letting saline water and processing said water to produce desalinated water. The invention relates to both the process and apparatus used in performing the process.

BACKGROUND

Desalination has been a practical solution to the water shortage problems encountered in numerous countries of the world, in particular, in regions where both the rain fall is scarce and/or the population concentration is high. Numerous commercial-scale desalination plants have been designed, built and operated, such as (i) the multi-stage flash (MSF) type, (ii) the multi-effect desalination type, (iii) the membrane-based reverse osmosis (RO) plants. Hybrid plants, combining the RO and MSF processes can recover higher water yields of high water quality, typically the dissolved solids being less than 500 mg/l, satisfying the requirements of the World Health Organization (WHO) standards. Ion exchange is another method whereby ions of dissolved inorganic salts are replaced with the more desirable ions, and such as a process have been used to minimize the fouling and carry-over to the water.

In general, the conventional desalination plants display three fundamental drawbacks, being: (i) the high energy usage to maintain relatively high temperatures, typically exceeding 110° C., (ii) the high energy consumption of the plant and (iii) the high maintenance costs arising from salt deposition or fouling in the outer surfaces of heat exchangers as well as the corrosion of the tubes. Fouling is accelerated by high solution temperatures and the threshold for high salt deposition from the solution is known to occur when temperatures exceed 80° C. or so.

STATEMENT OF THE INVENTION

It is therefore an object of the present invention to reduce the energy requirements of desalination as compared to the high energy processes of the prior art.

In a first aspect, the invention provides a water desalination system comprising an evaporator for evaporating saline water to produce water vapour; an adsorption means in selective vapour communication with the evaporator for reversibly adsorbing the water vapour from the evaporator; said adsorption means in selective vapour communication with a condenser, and; desorbing means for desorbing the adsorbed water vapour from the adsorption means for collection by the condenser; said condenser adapted to condense the water vapour to desalinated water.

Thus, by using an evaporation system, the energy requirements to create the water vapour are considerably lessened.

In a preferred embodiment, the adsorption means may include at least one array of adsorption beds, each bed comprising a quantity of adsorbent material. In a more preferred embodiment, the at least one array of adsorbent beds may be arranged vertically within at least one reaction bed tower.

In a further preferred embodiment, each bed may a finned-tube heat exchanger, with the adsorbent material placed in interstitial spaces between said finned tubes. Said material may be silica gel, synthetic zeolite, or any other hydrophilic porous adsorbent, with said materials possibly having a surface pore area not less than 500 $m^2/g$.

In a preferred embodiment each of said beds may include a mesh adapted to encapsulate the heat exchanger so as to retain the adsorbent material.

In a preferred embodiment, the temperature range within the evaporator may be in the range 5° C. to 40° C. Whilst in a preferred embodiment, there may be the use of a hot water re-circulation system, this is not necessary for the evaporator, but to enhance the desorption of the water vapour from the adsorbent beds.

A further consequence of using low temperature evaporation rather than direct heating of the saline water to produce water vapour is that at these low temperatures, fouling is reduced significantly during the evaporation of the saline or brackish solution and thus lowers the maintenance cost of plant operation.

Owing to low fouling rates and vacuum pressures, conventional carbon steel may be used for many of the key components of the plant such as the adsorber and desorber towers, as well as the condenser unit.

Only the evaporator unit may require alloy steel to prevent excessive corrosion. Alternatively, chilled water from the evaporator may be used to cool the designated desorber towers for the first quarter of the cycle and then re-directed to the adsorption towers for the second quarter of the cycle. By lowering the condensing pressure (with the cooler chilled water), condensation of vapour may be expedited as the tube surfaces are much cooler. In the same manner, the lowering of the adsorbent temperature (when chilled water is channeled into the adsorber towers) may enhance the vapour-uptake by the adsorbent.

In a second aspect, the invention provides a process for desalinating water comprising the steps of evaporating saline water within an evaporator to produce water vapour; reversibly adsorbing the water vapour from the evaporator using an adsorption means in selective vapour communication with the evaporator; desorbing the adsorbed water vapour from the adsorption means using desorbing means and delivering the water vapour to a condenser; condensing the water vapour to form desalinated water.

In a preferred embodiment, the evaporating and adsorbing steps may be performed until saturation of the adsorption means, whereupon the vapour communication between the adsorption means and the evaporator is selectively disengaged, and the desorbing and condensing steps commenced until a substantial quantity of the adsorbed water vapour has been desorbed from the adsorption means, said vapour communication subsequently re-engaged.

In a preferred embodiment, the arrays of adsorbent beds may be arranged into at least 2 towers, such that the desorbing step is performed in one tower and the adsorbing step is performed in the second tower. In a more preferred embodiment, the adsorbing step may be performed until saturation of the adsorbent means. In a further embodiment, the desorbing step may be performed until the adsorbed water vapour is substantially removed from the desorbing tower. In a preferred embodiment, the process may switch the adsorbing step and the desorbing step between the towers, either at saturation or at substantial removal of adsorbed water vapour or when both processes are complete. Alternatively, the processes may be switched according to other parameters, such as economic, maintenance, water production requirements, peak loading etc.

In a more preferred embodiment, the array of adsorbent beds may be arranged into two groups of a plurality of reaction bed towers, such that the desorbing step is performed in the first group and the adsorbing means is performed in the second group. As with the previously described embodiment, the decision to switch the processes may depend on saturation, substantial removal etc.

BRIEF DESCRIPTION OF DRAWINGS

It will be convenient to further describe the present invention with respect to the accompanying drawings, which illustrate possible arrangements of the invention. Other arrangements of the invention are possible and consequently, the particularity of the accompanying drawings is not to be understood as superseding the generality of the proceeding description of the invention.

Figure 1:
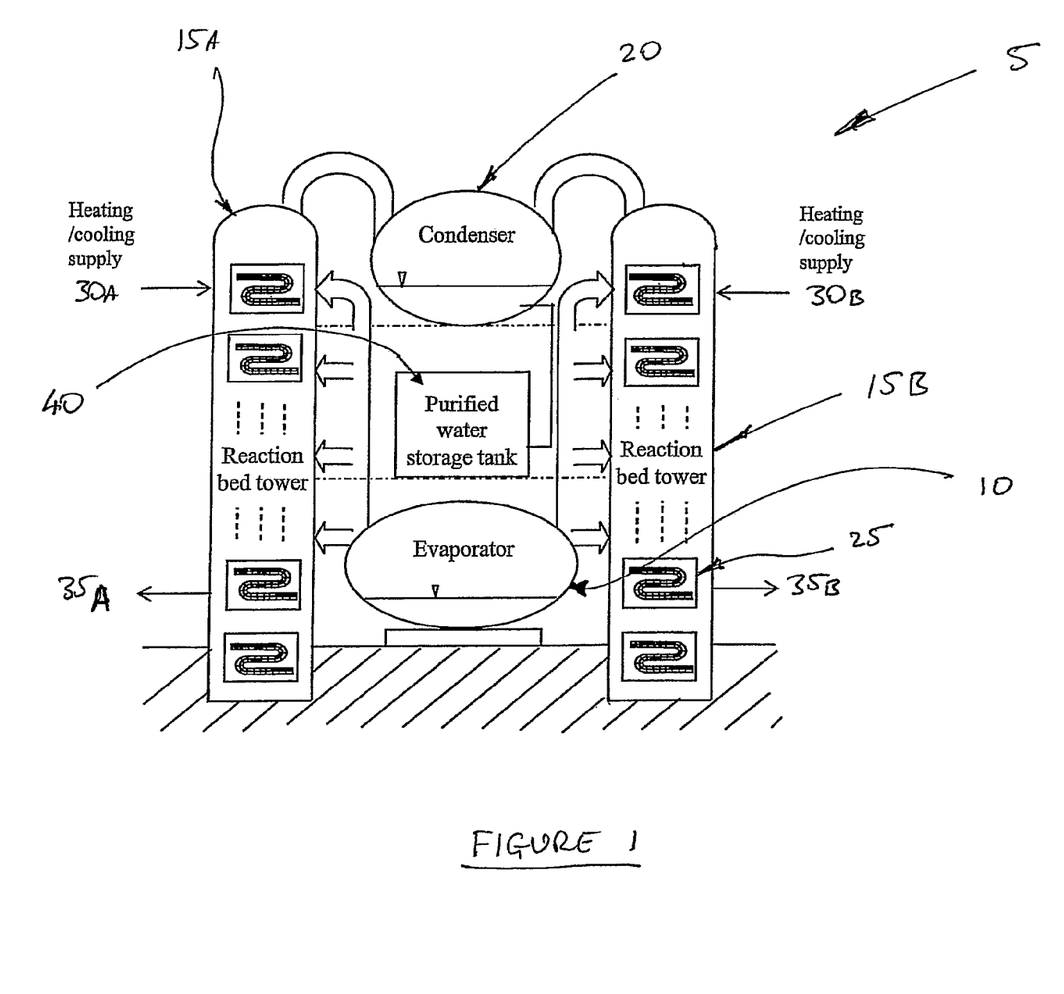
FIG. 1 is a schematic view of the desalination system and process according to the present invention.

FIG. 1 shows a schematic view of the desalination system 5 according to the present invention. The process involves the evaporation of saline water, which is subsequently condensed within a condenser to provide desalinated water. According to the present invention, the process involves the evaporator 10 having a supply of saline water subjected to a relatively low temperature environment for instance in the range 5° C. to 40° C. Water vapour is directed to an array of adsorbent beds 25 arranged in reaction bed towers 15a and 15b. The adsorbent beds adsorb the water vapour using an adsorbent material, for instance, a silica gel having a surface pore area greater than 500 m$^2$/g. To enhance the adsorption, the adsorbent beds include heat exchangers subject to the circulation of a coolant.

The process according to the present invention is fundamentally a batch process comprising two stages. The first stage being the adsorbent phase, involves the water vapour being directed to the adsorbent beds for a predetermined time. The predetermined time may be a function of the saturation capacity of the adsorbent material or, alternatively, subject to achieving the most effective or efficient process either economically or production-wise.

On the commencement of the second stage, being the desorbing phase, the supply of water vapour is disconnected from the adsorbent beds and a conduit to the condenser is opened. In order to achieve equilibrium, the saturation point of the adsorbent material will be such that water vapour is then directed to the condenser. However, for a more efficient and high production process, the heat exchangers may be subjected to supply of heat 30a and 30b in order to extract the adsorbed water vapour. The condenser 20 captures and condenses the desorbed water vapour, and subsequently directs this to a water storage tank 40 containing the desalinated water.

Whilst not essential to the invention, the process according to the present invention is made more efficient, and so increases water production, through cooling the array of adsorbent beds during the adsorption phase and heating of the array during the desorbing phase. To maintain the desired temperature within the array of adsorbent beds during each of the phases, the heating and cooling supply may further include a re-circulation system 30a, 30b, 35a and 35b, whereby the coolant/heating supply may be maintained at the appropriate temperature within the array through constant replenishment.

Figure 2:
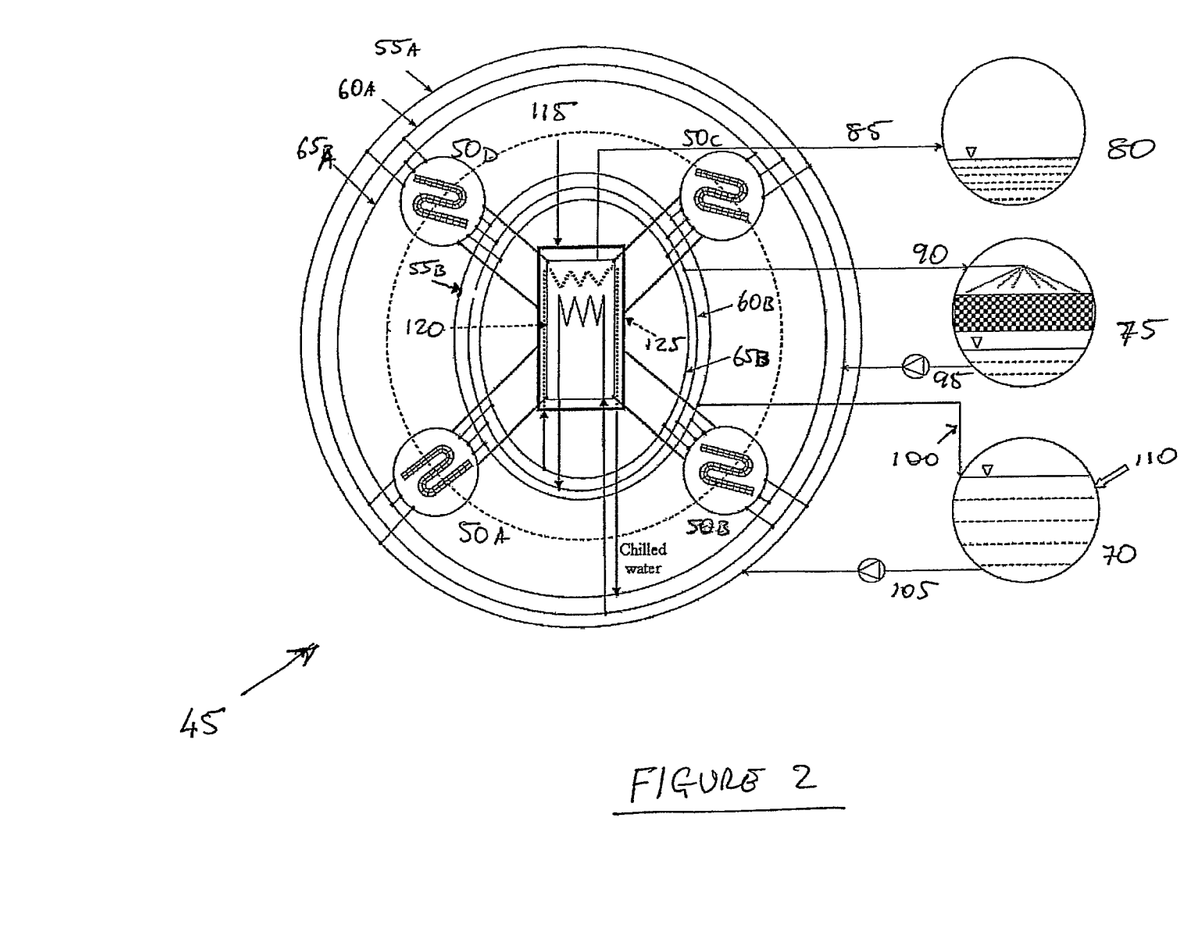
FIG. 2 is a plan schematic view according to one embodiment of the present invention.

FIG. 2 shows a more detailed view of one embodiment of the present invention. The desalination system 45 of this embodiment shows four reaction bed towers 50a to 50d, each having separate adsorbent bed arrays located therein. As with the general schematic of FIG. 1, saline water 115 is fed into the evaporator 125 with the water vapour being directed to each of the reaction bed towers 50a to 50d. The reaction bed towers 50a to 50d are each connected to a supply of hot water 70, cooling water 75 and chilled water 80. In this schematic view, each of the aforementioned supplies are made available through common supply lines 55a, 60a and 65a with the communication of these sources being subject to selectively operable valves, which are opened or closed subject to which phase the respective tower is operating under. The subsequent waste water is fed into corresponding common lines 55b, 60b and 65b for re-circulation to the various supplies.

Describing in more detail these supplies, the cooling water is circulated from a cooling tower (not shown), whereby the collected heat from the reaction bed towers is dissipated to the environment. The re-cooled water 95 is then returned to the common cooled water line 60a for distribution to the appropriate reaction bed tower in the adsorbent phase. It should be noted that, for a range of purposes, it may be preferable to only re-circulate a portion of the cooling water. The non-circulated water may be dumped, used for a different system, or perhaps used as a tertiary cooling supply.

The hot water supply used in the desorbing phase comprises a water supply 70 subject to a heating source. In one embodiment, the heating source may be waste heat from, for instance, a gas turbine exhaust or alternatively, from a renewable energy source such as solar heating, geothermal, or a conveniently placed thermal mass. Of course, where such convenient low cost energy supplies are not available, conventional higher cost energy sources may be used.

The hot water 105 is supplied to the common supply line 55a and again distributed to the appropriate reaction bed towers 50a to 50d. It is subsequently collected by a common waste hot water line 55b and returned to the hot water supply 100 for re-heating. As with the cooling water, it may be preferable to re-circulate only a portion of the hot water. The remaining water may be dumped, used for a secondary purpose, such as assisting with evaporation, or used as a tertiary heating supply.

The chilled water in this embodiment is provided by the evaporator 125, whereby the latent cooling caused by the evaporation of the saline water chills the chilled water supply, which is then delivered to the common supply line 65a. As with the other lines, the chilled water is used within the appropriate reaction bed tower 50a to 50d and returned to a common return line 65b to be collected by the evaporator ready for re-chilling. As with the hot and cooling water systems, only a portion of the chilled water may be re-circulated, with the remaining portion dumped, or used to re-stock the cooling water supply.

In a further embodiment, either or both of the cooling water or chilled water supplies may be used in the condenser to further enhance the water production rate through condensing the water vapour made available through the desorbing stage. The desalinated water 85 is then delivered to the water supply storage 80.

The arrangement of FIG. 2 lends itself to a particular embodiment of the present invention, whereby two towers 50a and 50b are in the adsorbing phase and the remaining two towers, 50c and 50d are in the desorbing phase. For this arrangement to occur, the valves controlling the circulation of the hot, cooled and chilled water as well as vapour gates for the evaporator and condenser must be selectively controlled. For the adsorbing phase towers 50a and 50b, it will be necessary to open the re-circulation valves to permit the cooled and chilled water to circulate through the appropriate heat exchangers in the appropriate towers 50a and 50b. In this embodiment, a first tower 50a may selectively open the valves for the cooling water and the second tower 50b may open the valves for the chilled water, both of which aid in the adsorption of the water vapour from the evaporator. Clearly to have access to the supply of water vapour, communication with the evaporator 125 is required. However, non-adsorbed water vapour will be prevented from moving to the condenser 120 and therefore, the vapour gates connecting the towers 50a and 50b to the condenser will be closed.

Conversely, the towers 50c and 50d in the desorbing phase will have the valves connecting the hot water to the appropriate towers 50c and 50d opened, and the valves controlling re-circulation of the chilled and cooling water appropriately closed. Thus, the heat exchangers will aid in desorbing the adsorbent material of the water vapour for delivery to the condenser 120. Any excess water vapour from the evaporator will be prevented from being adsorbed by the adsorbent material due to the elevated temperature caused by the hot water re-circulation. Consequently the vapour gate connecting the towers 50c and 50d to the evaporator 125 will be closed.

It follows that at the end of the cycle, the roles of the towers will be swapped so as to desorb the water vapour from the towers 50a and 50b, whilst reloading the adsorbent material with water vapour from the evaporator 125 for the other towers 50c and 50d. Hence, whilst the process according to the present invention is essentially a batch process, the arrangement just described facilitates a continuous flow of water vapour through the system, maintaining water production at reasonable levels. It follows that water production will not be uniform as there will be significant lead time in recharging the various towers 50a to 50d, either to elevate the temperature when changing from the adsorption phase to the desorbing phase, or conversely, dropping the temperature for converting from the desorbing phase to the adsorption phase.

Figure 3:
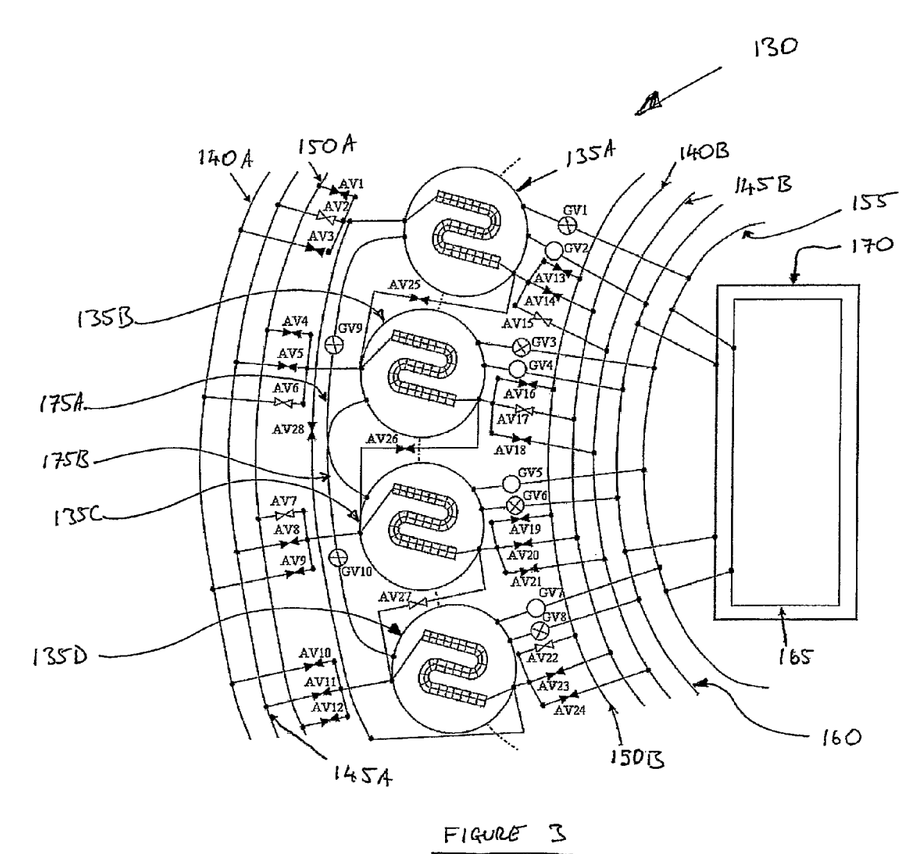
FIG. 3 is a detailed schematic view of a second embodiment according to the present invention.

FIG. 3 shows a further embodiment of the present invention. This particular embodiment comprises four reaction bed towers 135a to 135d arranged in a cluster 130 to achieve a "temperature-cascade". This cluster may be one of several clusters, all operating within the same system and for instance, each cluster may be in communication with the same evaporator and condenser.

As with the previous embodiment, a re-circulation system has been implemented whereby a source supply line for the cooling water 140a, chilled water 145a and hot water 150a are connected to each of the reaction bed towers 135a to 135d. The towers are subsequently connected to re-circulation lines for the cooling water 140b, chilled water 145b and hot water 150b. As discussed in the previous embodiment, each of these re-circulation lines may be connected to the original source such as a cooling tower for the cooling water source or the evaporator for the chilled water source. As with the evaporator and condenser, the supply and re-circulation lines may service several clusters and thus providing efficient use of the infrastructure in connection to multiple clusters.

As with the two-tower embodiment, the cluster embodiment involves emulating a continuous water production system through an efficient use of a batch process. In this embodiment, two towers 135a, b are in the adsorbing phase and two towers 135c, d are in the desorbing phase. To optimise the supply of water and efficient use of capital infrastructure, the primary adsorbing tower 135a is in communication with the chilled water supply 145a through opening valve AV2. The chilled water is returned to the re-circulation line through opening valve AV14, so providing a direct line for the re-circulation of the chilled water.

The secondary adsorbing tower 135b receives its temperature coolant from the cooling water line 140a through value AV6 and re-circulated through valve AV17 to the re-circulation line 140b. As with the primary adsorbing tower 135a, the secondary adsorbing tower 135b permits vapour re-circulation back to the evaporator through gate valve GV4.

The absorbing towers 135c, d have direct connection to the hot water supply line 150a through valve AV7. In this embodiment, the hot water supply is directed through the primary desorbing tower 135c and then directed to the secondary desorbing tower 135d through valve AV27 and subsequently to the hot water re-circulation line 150b through valve AV22.

Consequently, the vapour resulting from the desorbing phase is delivered to the common vapour condenser line from each of the desorbing towers 135c, d through gate valves GV5 and GV7 to direct the desorbed water vapour to the condenser 165.

A feature of the cluster embodiment is the flexibility to operate a "temperature cascade" between the reaction bed towers 135a to d. It can be seen that there is a temperature differential between each of the towers with 135a receiving chilled water and so colder than the coolant provided to the secondary adsorbing tower 135b. Further, the direct hot water connection to the primary desorbing tower 135c would heat the adsorbent beds to a higher temperature than the equivalent adsorbent beds in the secondary desorbing tower 135d, as the secondary desorbing tower 135d receives the "used" hot water from the primary desorbing tower 135c. It follows that the "used" hot water will be cooler than water in direct connection with the hot water supply line 150a. It should be noted that in an alternative embodiment, the secondary desorbing tower may receive hot water from a secondary source having a temperature less than the hot water supply line 150a other than the "used" hot water. Thus, secondary sources of hot water having very low energy requirements may be used and still achieve the temperature cascade of the cluster embodiment. Sources of such hot water will be evident to the person skilled in the art and for instance, may be of the previously mentioned renewable energy sources or an economic cycle of direct energy input such as mains and electricity.

In a further embodiment, the vapor space within the optimally saturated adsorbers and non-saturated desorbers are designed to be inter-connected through valves GV9 and GV10 over a short finite period within the prescribed switching intervals, but concomitantly, the towers remain isolated from the condenser and evaporator. This is termed as the pressure equalization (PE) procedure which is a form of heat and mass recovery, providing a further boost to water production yield of the desalination plant. During the pressure equalization through opening the appropriate valve GV9 or GV10, the tower which was previously a desorber would experience a sudden drop in the vapour pressures and thereby partially releasing more adsorbate (vapour) from the silica gel. Concomitantly, the previously lower pressure adsorber tower would experience a sudden rise in vapour pressure, causing an increase in the uptake of vapour by the adsorbent. Such an energy recovery is conducted without any external heat input because the process utilizes the energy stored previously.

Another aspect of energy recovery procedure is that the externally supplied heat source to the towers could either be by-passed momentarily or continued to supply into the towers. Should the by-pass mode is used, energy input to the plant could be conserved. These processes could boost the desalinated water yield by a further 10 to 15%.

Figure 4:
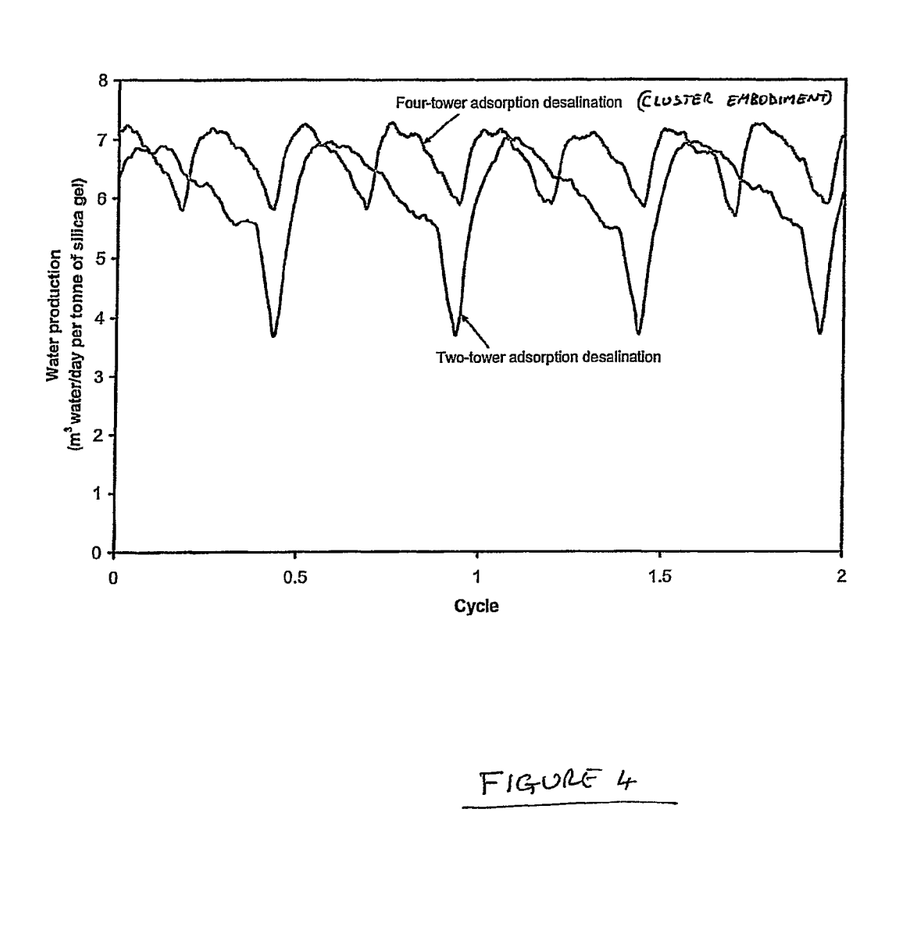
FIG. 4 is a graphical comparison of the water production of two embodiments according to the present invention.

Apart from the more efficient management of energy, the cluster embodiment having the temperature cascade yields a more uniform water production. Cycling of the reaction bed towers from primary to secondary within each phase, and also cycling of towers between the adsorbing and desorbing phase mean there is a smaller temperature differential for the reaction bed towers to overcome before efficiently adsorbing or desorbing water vapour, as appropriate. This comparison between the cluster embodiment in FIG. 4 is shown against the two-tower embodiment previously described. As will be noted, both methods are efficient, low energy producers of desalinated water with the cluster embodiment providing a smaller differential between peak and trough production. This, of course, is offset against the higher capital cost of the cluster embodiment and which embodiment of the present invention will suit a certain application will be determined based on case-by-case basis.

In more detail, FIG. 4 shows the cyclic fluctuations in the production of water from an experimental desalination plant. With 144 kg (4×36 kg) in the 4 towers, two operating strategies are studied, namely the 2-tower and the 4-tower cycles, at the standard rating conditions ($T_{hot}$=85° C., $T_{cool}$=31° C., $T_{chilled}$=15° C.). It was found that an average of 38 kg/h of desalinated water could be achieved for a 4-bed cycle and about 35 kg/h of desalinated for the 2-tower cycle. Translated in terms of the specific daily yield in $m^3$ of water per tonne of silica gel, the production yields are respectively 6.3 $m^3$ and 5.8 $m^3$ per day per tonne of adsorbent.

To extract the potable water, a simple vacuum pump or a 10 m U-bend discharge tube may be readily incorporated from the storage tank. Such variations, and others not stated but lying within the common general knowledge will be clear to the skilled addressee.

Most water production sizes of commercial scale desalination plants are of the order of million gallons per day (MGD). One alternative falling within the present invention, is to have modular design for the reactor towers, as proposed in FIGS. 1 to 3. A 200 tonne capacity of adsorbent per "silo"-type tower may have a diameter of 4 to 5 m and a height of 25 m, as shown in FIG. 1.

Construction costs may be reduced by using high strength foam concrete as the structural materials, lined internally with a thin inner steel sheet for maintaining the vacuum conditions. Foam concrete towers provide good thermal insulation and reduce heat leaks to ambient. Other construction methods may be adopted, and will be clear to the skilled addressee, without affecting or limiting the scope of the invention.

For such a plant capacity and operating at the standard conditions, the predicted yield of potable water is about 1.25 MGD. Multiples of such 4-bed cluster design may be used to satisfy a need should a higher water production is required.

Figure 5:
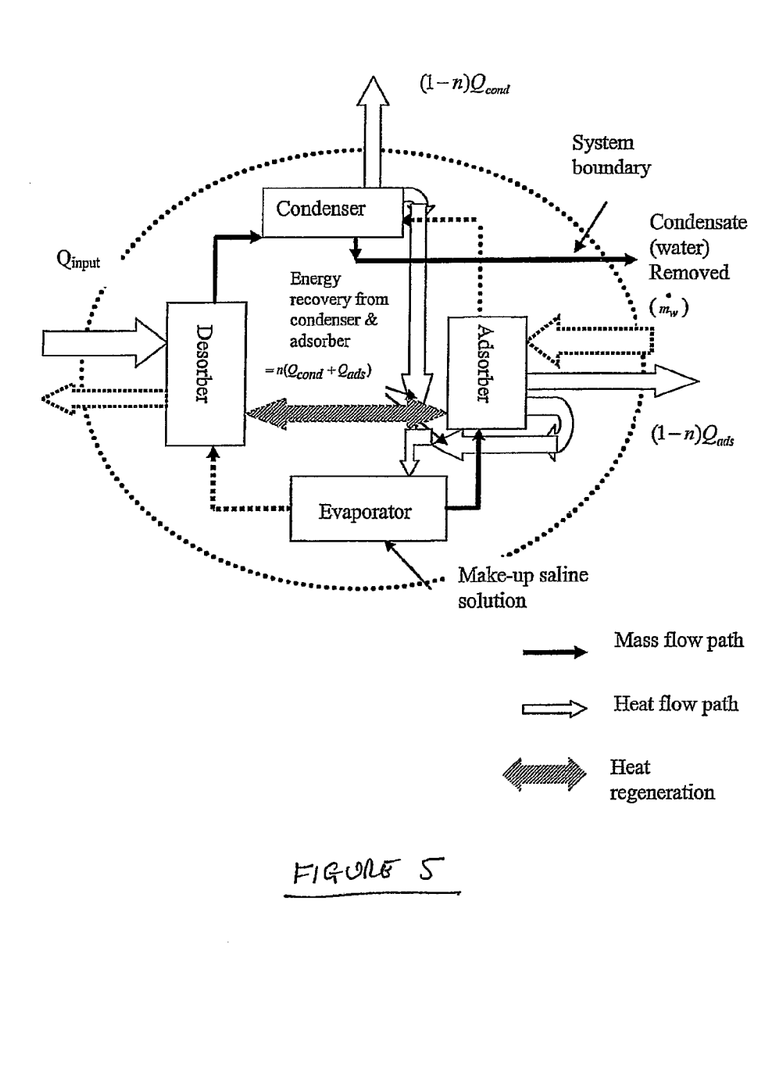
FIG. 5 is a schematic view of the mass/flow path of the desalination process according to an embodiment of the present invention.

FIG. 5 shows the regenerative heat flows from the adsorber towers and the condenser into the evaporator of the adsorption desalination plant. From 1st Law analysis, the heat input is given simply by $$Q_{in} = (1-n)(Q_{cond} + Q_{ADS})$$

where n is fraction the amount of regenerated heat to the total heat in the process (assuming equal amount in both the adsorber towers and the condenser). The $COP_{AD}$ is given by the ratio of the energy used to generate the condensate to the heat input, i.e., $$COP_{AD} = \cdot \frac{\int_0^\tau m_w h_{fg}}{\int_0^\tau Q_{input}} \approx \frac{n}{1-r}$$

The range of $COP_{AD}$ would be comparatively better than the "kettle-type" boiler or desalinator when the heat regenerative index, n, varies from 0.3 to 0.55. Between these values, the regeneration index "n" would have an optima where the water production is maximum and thus, a realistic operating point for the adsorption plant. For the water temperature of evaporator (that could be utilized by the regenerative processes), it should be equal or lower than the cooling tower temperature. However, the COP of the proposed heat driven adsorption desalination plant is comparably better than the conventional "kettle" boiler and it has the added advantage of much lower fouling at the evaporator.

The invention claimed is:

1. A water desalination system comprising:
an evaporator for evaporating saline water to produce water vapor;
an adsorber in vapor communication with the evaporator during an adsorption process reversibly adsorbing the water vapor received from the evaporator by an adsorbent material;
said adsorber in selective vapor communication with a condenser configured to condense the water vapor to provide desalinated water, and;
a desorber configured to desorb the adsorbed water vapor from the adsorber for collection by the condenser;
said adsorber comprising at least two adsorbent beds configured to adsorb the water vapor, and;
the adsorber including a cooling water circulation system, proximate to the at least two adsorbent beds for selectively cooling said at least two adsorbent beds to aid in the adsorption of the water vapor;
a selectively operable set of valves arranged to simultaneously permit a first bed of said at least two adsorbent beds to be in vapor communication with the condenser while said desorber desorbs the water vapor and permit a second bed of said at least two adsorbent beds to be in vapor communication with the evaporator such that said second bed reversibly adsorbs the water vapor.

2. The system according to claim 1, wherein the adsorber includes at least one array of adsorption beds, each bed comprising a quantity of adsorbent material.

3. The system according to claim 2, wherein the at least one array of adsorbent beds is arranged vertically within at least one reaction bed tower.

4. The system according to claim 1, wherein each bed includes a finned-tube heat exchanger, said adsorbent material placed in interstitial spaces between said finned tubes.

5. The system according to claim 2, wherein the adsorbent material comprises at least one of silica gel and synthetic zeolite.

6. The system according to claim 2, wherein said material includes a surface pore area not less than 500 m$^2$/g.

7. The system according to claim 4, wherein each of said beds includes a mesh adapted to encapsulate the heat exchanger so as to retain the adsorbent material.

8. The system according to claim 4, wherein said cooling water circulation system is configured to circulate cooling water to the heat exchangers.

9. The system according to claim 8, wherein the cooling water is sourced from a cooling tower.

10. The system according to claim 9, wherein the cooling water circulation system re-circulates at least a portion of the cooling water from the heat exchangers back to the cooling tower.

11. The system according to claim 8, wherein the cooling water circulation system further includes a chilled water circulation system for circulating chilled water to the heat exchangers.

12. The system according to claim 11, wherein the chilled water is sourced from the evaporator.

13. The system according to claim 12, wherein the chilled water circulation system re-circulates the chilled water from the heat exchangers back to the evaporator.

14. The system according to claim 11 wherein at least a portion of the chilled water within the chilled water circulation system is recirculated to the cooling water circulation system subsequent to being active with the remaining beds within the second group.

15. The system according to claim 4, wherein the desorber includes a heating device proximate to the at least one array of beds for heating each bed to aid in the desorption of the adsorbed water vapor.

16. The system according to claim 15, wherein said heating device comprises heating water circulation system circulating hot water to the heat exchangers.

17. The system according to claim 16, wherein the hot water is sourced from a hot water tank.

18. The system according to claim 17, wherein the hot water circulation system re-circulates the hot water from the heat exchangers back to the hot water tank.

19. The system according to claim 17, wherein the hot water tank is supplied with energy comprising at least one of waste heat, renewable energy source and mains electricity.

20. The system according to claim 19, wherein the waste heat is provided from the exhaust of a gas turbine.

21. The system according to claim 19 wherein the renewable energy source comprises at least one of solar heat, geothermal heat and thermal mass.

22. The system according to claim 3 wherein the at lest one array of adsorbent beds are arranged into at least 2 towers, such that the desorber is active in one tower and the adsorber is active in the second tower.

23. The system according to claim 2, wherein the at least one array of adsorbent beds are arranged into two groups of a plurality of reaction bed towers, such that the desorber is active in the first group and the adsorber is active in the second group.

24. The system according to claim 23, wherein the cooling water circulation system is selectively active with a portion of the reaction bed towers within the second group, and the chilled water circulation system will be selectively active within the remaining reaction bed towers within the second group.

25. A process for desalinating water comprising the steps of:
evaporating saline water within an evaporator to produce water vapor;
then communicating the water vapor from the evaporator to an adsorber comprising a first and second adsorption bed and cooling the first adsorption bed using a cooling water circulation system;
then reversibly adsorbing the water vapor received from the evaporator using the first cooled adsorption bed by adsorbing the water vapor by an adsorbent material in the adsorber;
simultaneously desorbing adsorbed water vapor from the second adsorption bed using a desorber and delivering the water vapor to a condenser in vapor communication with the second adsorption bed and;
subsequently condensing the water vapor to form desalinated water.

26. The process according to claim 25, wherein the adsorber included at least one array of adsorption beds, each bed comprising a quantity of adsorbent material.

27. The process according to claim 26, wherein the at least one array of adsorbent beds is arranged vertically within at least one reaction bed tower.

28. The process according to claim 27, wherein the evaporating and adsorbing steps are performed until saturation of the adsorber, whereupon the vapor communication between the adsorber and the evaporator is selectively disengaged, and the desorbing and condensing steps commenced until a substantial quantity of the adsorbed water vapor has been desorbed from the adsorber, said vapor communication subsequently re-engaged.

29. The process according to claim 26, wherein the cooling step includes circulating cooling water proximate to the at least one array of beds for cooling each bed to aid in the adsorption of the water vapor.

30. The process according to claim 26, wherein the cooling step further includes circulating chilled water proximate to the at least one array of beds for chilling each bed to aid in the adsorption of the water vapor.

31. The process according to claim 26, wherein the desorbing step includes circulating hot water proximate to the at least one array of beds for heating each bed to aid in the desorption of the adsorbed water vapor.

32. The process according to claim 26 wherein the at least one array comprises arrays of adsorbent beds arranged into at least 2 towers, such that the desorbing step is performed in one tower and the adsorbing step is performed in the second tower, until saturation of the adsorber in the adsorbing step tower, and adsorbed water vapor is substantially removed from the desorbing tower, whereupon the application of the adsorbing step and the desorbing step is switched to the opposed towers.

33. The process according to claim 26, wherein the at least one array of adsorbent beds are arranged into two groups of a plurality of reaction bed towers, such that the desorbing step is performed in the first group and the adsorber is performed in the second group, until saturation of the adsorber in the first group, and adsorbed water vapor is substantially removed from the second group, whereupon the application of the adsorbing step and the desorbing step is switched to the opposed groups.

34. The process according to claim 33, wherein the step of circulating cooling water will be selectively performed with a portion of the reaction bed towers within the second group, and the step of circulating chilled water will be selectively active within the remaining reaction bed towers with in the second group.

35. A water desalination system comprising:
an evaporator for evaporating saline water to produce water vapor;
an adsorber in vapor communication with the evaporator during an adsorption process reversibly adsorbing the water vapor received from the evaporator by an adsorbent material;
said adsorber in selective vapor communication with a condenser configured to condense the water vapor to provide desalinated water, and;
a desorber configured to desorb the adsorbed water vapor from the adsorber for collection by the condenser;
said adsorber comprising at least two adsorbent beds configured to adsorb the water vapor, and;
the adsorber including a cooling water circulation system, proximate to the at least two adsorbent beds for selectively cooling said at least two adsorbent beds to aid in the adsorption of the water vapor;
a first bed of said at least two adsorbent beds in vapor communication with the condenser while said desorber desorbs the water vapor simultaneously with a second bed of said at least two adsorbent beds in vapor communication with the evaporator such that said second bed reversibly adsorbs the water vapor; and
wherein each bed includes a heat exchanger comprising a plurality of tubes, said adsorbent material placed in interstitial spaces between said tubes.

* * * * *